(12) United States Patent
Horie et al.

(10) Patent No.: US 10,740,230 B2
(45) Date of Patent: Aug. 11, 2020

(54) HEAP CONTRACTION FOR INCREASING MEMORY DENSITY IN CLOUD ENVIRONMENT

(71) Applicant: INTERNATIONAL BUSINESS MACHINES CORPORATION, Armonk, NY (US)

(72) Inventors: Michihiro Horie, Saitama (JP); Hiroshi H. Horii, Tokyo (JP); Kazunori Ogata, Tokyo (JP); Tamiya Onodera, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 15/299,206

(22) Filed: Oct. 20, 2016

(65) Prior Publication Data

US 2018/0113805 A1 Apr. 26, 2018

(51) Int. Cl.
*G06F 16/00* (2019.01)
*G06F 12/02* (2006.01)
*G06F 16/188* (2019.01)
*G06F 16/10* (2019.01)

(52) U.S. Cl.
CPC .......... *G06F 12/0261* (2013.01); *G06F 16/10* (2019.01); *G06F 16/188* (2019.01); *G06F 2212/1044* (2013.01); *G06F 2212/702* (2013.01)

(58) Field of Classification Search
CPC .......... G06F 12/0253; G06F 2212/702; G06F 2212/1044; G06F 17/30312; G06F 17/30336; G06F 12/0261; G06F 16/10; G06F 16/188; G06F 16/2308; G06F 16/24526

USPC .................................................. 707/600–899
See application file for complete search history.

(56) References Cited

U.S. PATENT DOCUMENTS

| | | | |
|---|---|---|---|
| 7,010,555 B2 | 3/2006 | Blandy et al. | |
| 7,490,117 B2 * | 2/2009 | Subramoney | G06F 11/348 |
| 7,653,797 B1 * | 1/2010 | Phillips | G06F 12/0261 |
| | | | 711/133 |

(Continued)

OTHER PUBLICATIONS

Baishnab, et al., "An Efficient Heap Management Technique with Minimum Fragmentation and Auto Compaction", 2010 3rd IEEE International Conference on Computer Science and Information Technology (ICCSIT), Jul. 2010.

(Continued)

*Primary Examiner* — Michelle N Owyang
(74) *Attorney, Agent, or Firm* — Tutunjian & Bitetto, P.C.; Vazken Alexanian

(57) ABSTRACT

A computer-implemented method and a computer processing system are provided for increasing memory density in a memory using heap contraction. The method includes dividing the heap into a plurality of work regions including a last region and other regions such the last region is larger in size than the other regions. The method further includes calculating a size of the heap contraction. The method also includes forming a pair of the last region and one of the other regions that has a largest free portion. The method additionally includes executing intra-table compaction and inter-table compaction on the heap. The method further includes contracting the last region by subtracting a prescribed space from the last region.

20 Claims, 5 Drawing Sheets

(56) References Cited

U.S. PATENT DOCUMENTS

| | | | |
|---|---|---|---|
| 8,769,230 B2 | 7/2014 | Burka et al. | |
| 9,053,033 B1 | 6/2015 | Tsirogiannis et al. | |
| 9,128,949 B2* | 9/2015 | Lipcon | G06F 3/0611 |
| 9,229,858 B2 | 1/2016 | Flood | |
| 2005/0273568 A1* | 12/2005 | Blandy | G06F 12/023 |
| | | | 711/170 |
| 2005/0289315 A1* | 12/2005 | Achanta | G06F 12/0269 |
| | | | 711/170 |
| 2007/0011660 A1* | 1/2007 | Garyali | G06F 9/445 |
| | | | 717/127 |
| 2012/0102289 A1* | 4/2012 | Maram | G06F 12/0253 |
| | | | 711/170 |
| 2012/0203991 A1* | 8/2012 | Burka | G06F 12/0269 |
| | | | 711/165 |
| 2013/0046951 A1* | 2/2013 | Jones | G06F 12/023 |
| | | | 711/171 |
| 2015/0026429 A1* | 1/2015 | Bobroff | G06F 12/0253 |
| | | | 711/171 |
| 2015/0293842 A1* | 10/2015 | Dawson | G06F 12/0269 |
| | | | 707/820 |
| 2015/0347023 A1* | 12/2015 | Konovalov | G06F 3/0608 |
| | | | 711/154 |
| 2015/0378870 A1* | 12/2015 | Marron | G06F 11/362 |
| | | | 717/128 |
| 2016/0117114 A1 | 4/2016 | Heller, Jr. | |
| 2016/0239413 A1* | 8/2016 | Stephens | G06F 12/0261 |

OTHER PUBLICATIONS

IBM, "Excessive Heap Compaction Causes Performance Overhead", IBM Support, available at: http://www-01.ibm.com/support/docview.wss?uid=swg21608319, 3 pages, Last downloaded Oct. 20, 2016.

* cited by examiner

HEAP CONTRACTION FOR INCREASING MEMORY DENSITY IN CLOUD ENVIRONMENT

BACKGROUND

Technical Field

The present invention relates generally to cloud computing and, in particular, to heap contraction for increasing memory density in a cloud environment.

Description of the Related Art

In cloud environments, it is desirable to increase the memory density of the runtime system when required. J9, a Virtual Machine (VM) program developed by IBM®, provides a mechanism named "softmx", which enables changing the maximum limit in a heap between the ms (i.e., a portion of the heap consisting of only live objects) and mx (i.e., a portion of the heap consisting of only free space). The physical memory for the address space from softmx and mx can be freed by the operating system.

One way to use softmx is as follows: (i) specify the "-Xsoftmx" option with a VM argument; and (ii) use the Java® Management Extensions (JMX®) library to set a softmx value.

In an existing approach, after the runtime system executes compaction in its garbage collector, if softmx is set, then the runtime system calculates how much the heap should be contracted. In J9, a necessary size in the last free region is contracted.

It is typical to execute the time-consuming compaction as a parallel compaction. Parallel compaction involves dividing the heap into several work regions and making Garbage Collection (GC) threads process these work regions in parallel. Then, two types of compaction are conducted: intra-table compaction; and inter-table compaction. When a GC thread acquires a table, the GC thread tries to move objects forward inside that table (e.g., by using a memmove function). When a GC thread acquires two tables at a time, the GC thread first executes intra-table compaction for the forward table and then tries to move objects in the latter table into the forward table.

However, parallel compaction by dividing the heap into multiple work regions often produces fragmentation, which means live objects tend to remain scattered in the heap. This result prevents a large amount of contraction because the last free region in the heap often becomes small due to the fragmentation. The only way to shrink the heap to a target size is to contract the heap little by little at each time of the parallel compaction. The preceding approach requires a significant amount of time to reach a target size of contraction.

SUMMARY

According to an aspect of the present invention, a computer-implemented method is provided for increasing memory density in a memory using heap contraction. The method includes dividing the heap into a plurality of work regions including a last region and other regions such the last region is larger in size than the other regions. The method further includes calculating a size of the heap contraction. The method also includes forming a pair of the last region and one of the other regions that has a largest free portion. The method additionally includes executing intra-table compaction and inter-table compaction on the heap. The method further includes contracting the last region by subtracting a prescribed space from the last region.

According to another aspect of the present invention, a computer program product is provided for increasing memory density in a memory using heap contraction. The computer program product includes a non-transitory computer readable storage medium having program instructions embodied therewith. The program instructions are executable by a computer to cause the computer to perform a method. The method includes dividing the heap into a plurality of work regions including a last region and other regions such the last region is larger in size than the other regions. The method further includes calculating a size of the heap contraction. The method also includes forming a pair of the last region and one of the other regions that has a largest free portion. The method additionally includes executing intra-table compaction and inter-table compaction on the heap. The method further includes contracting the last region by subtracting a prescribed space from the last region.

According to yet another aspect of the present invention, a computer processing system is provided. The computer processing system includes a processor operably coupled to a memory, configured to increase a memory density in the memory using heap contraction by dividing the heap into a plurality of work regions including a last region and other regions such the last region is larger in size than the other regions, calculating a size of the heap contraction, forming a pair of the last region and one of the other regions that has a largest free portion, executing intra-table compaction and inter-table compaction on the heap, and contracting the last region by subtracting a prescribed space from the last region.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to heap contraction for increasing memory density in a cloud environment.

In an embodiment, the present invention can contract the heap to a target size with a small number of compactions.

In the language runtime that supports garbage collection, when a requirement of shrinking the heap is issued (e.g., by using softmx in IBM® JVM® J9), in order to efficiently free the physical memory, heap compaction in accordance with an embodiment of the present invention moves objects located in the address space for the associated physical memory (in J9, from softmx to the last region in the heap) to one or more other regions on a priority basis.

In an embodiment, a larger size work region is created in the address space for the associated physical memory, when work regions are divided for parallel compaction. The last work region and the one region that has the largest free region is passed to a Garbage Collection (GC) thread. The number of GC threads is decreased in order to enlarge each size of the work region (e.g., the number of GC threads can even become one if needed). The softly-reachable objects in the address space of the associated physical memory are then freed. There are four types of references in Java which are as follows, in order of decreasing "strongness": strong; soft; weak; and phantom. An object is softly reachable if it is not strongly reachable and there is a path to it with no weak or phantom references, but one or more soft references.

Figure 1:
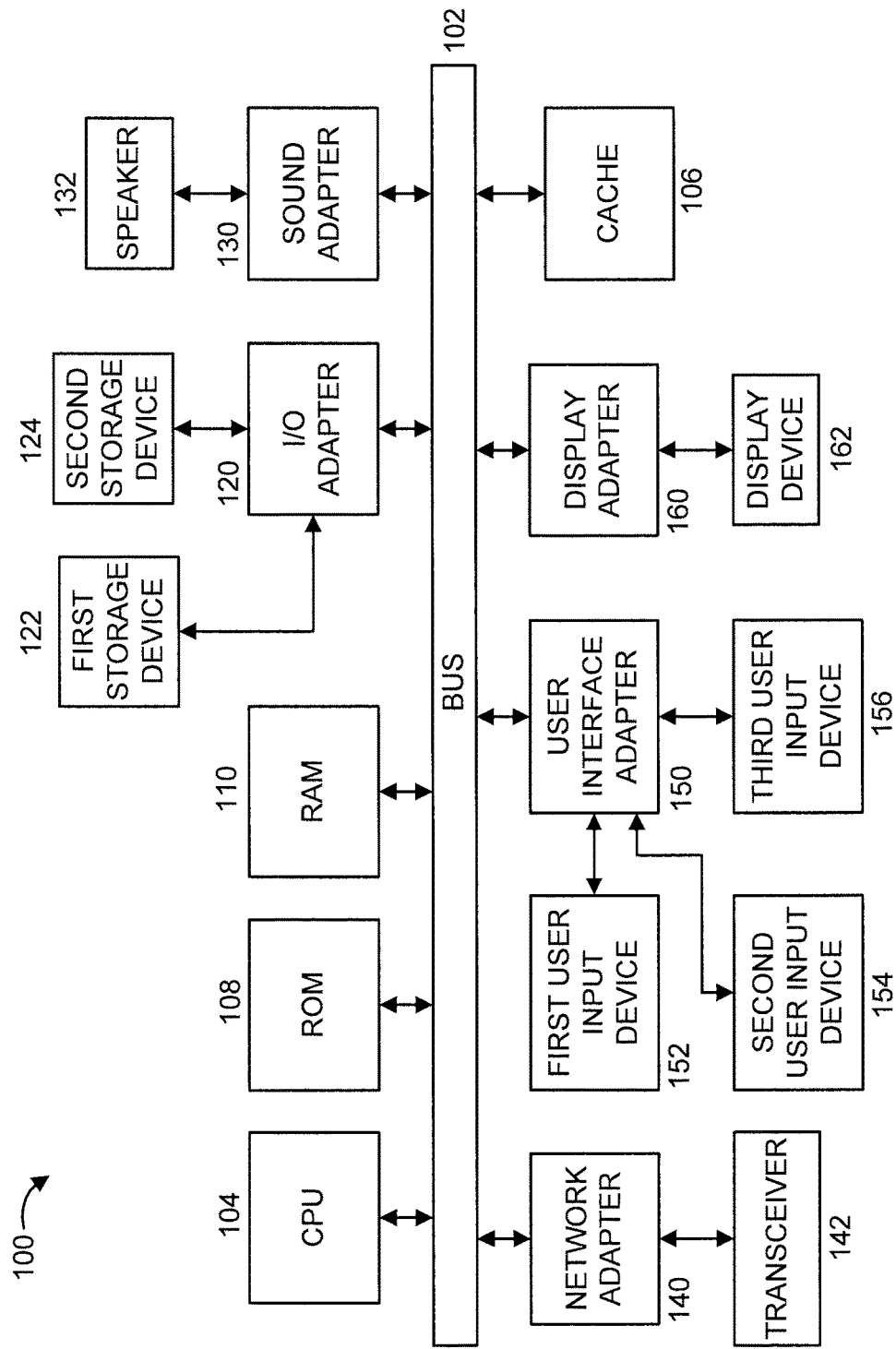
FIG. 1 shows an exemplary processing system to which the present invention may be applied, in accordance with an embodiment of the present invention.

FIG. 1 shows an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 4:
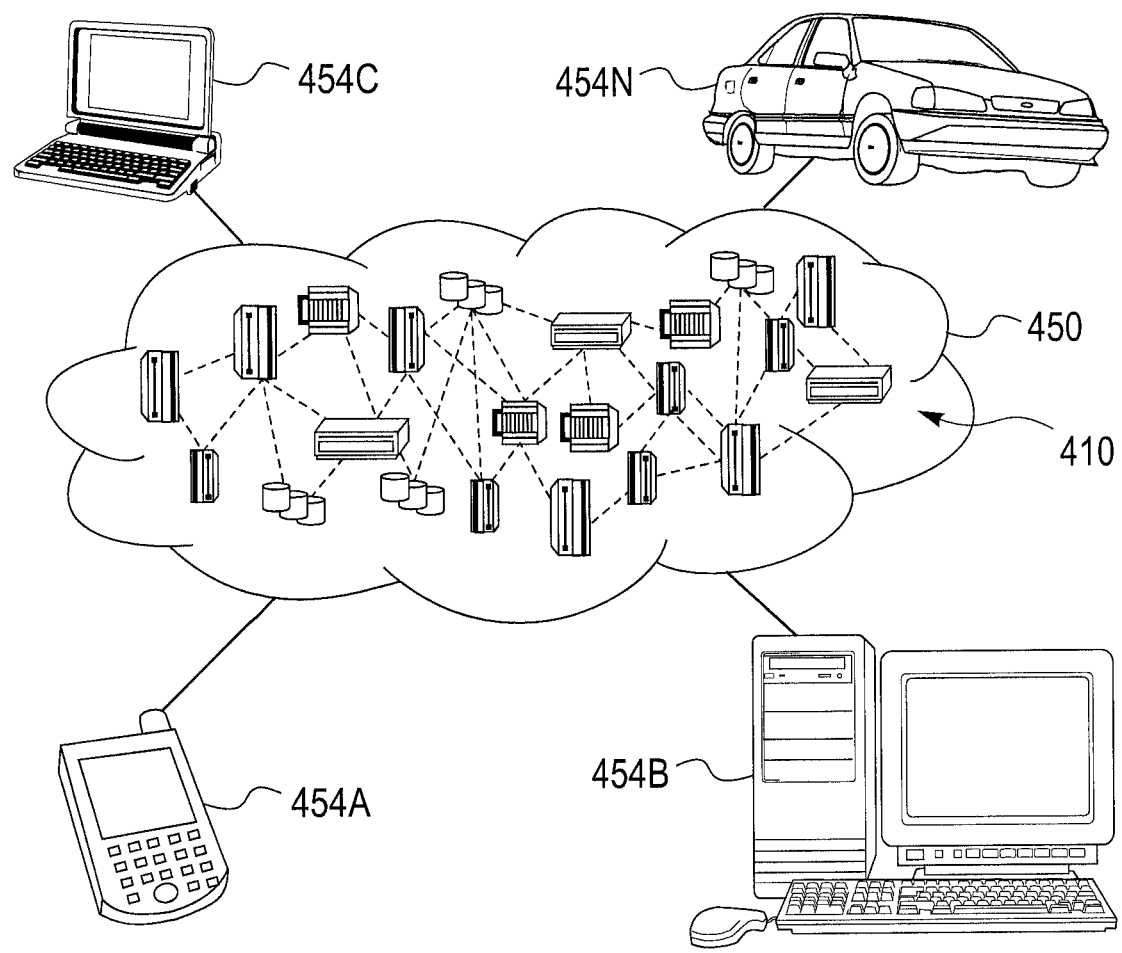
FIG. 4 shows an exemplary cloud computing environment, in accordance with an embodiment of the present invention.

Moreover, it is to be appreciated that cloud computing environment 450 described below with respect to FIG. 4 is an environment for implementing respective embodiments of the present invention. Part or all of processing system 100 may be implemented in one or more of the elements of cloud computing environment 450.

Figure 2:
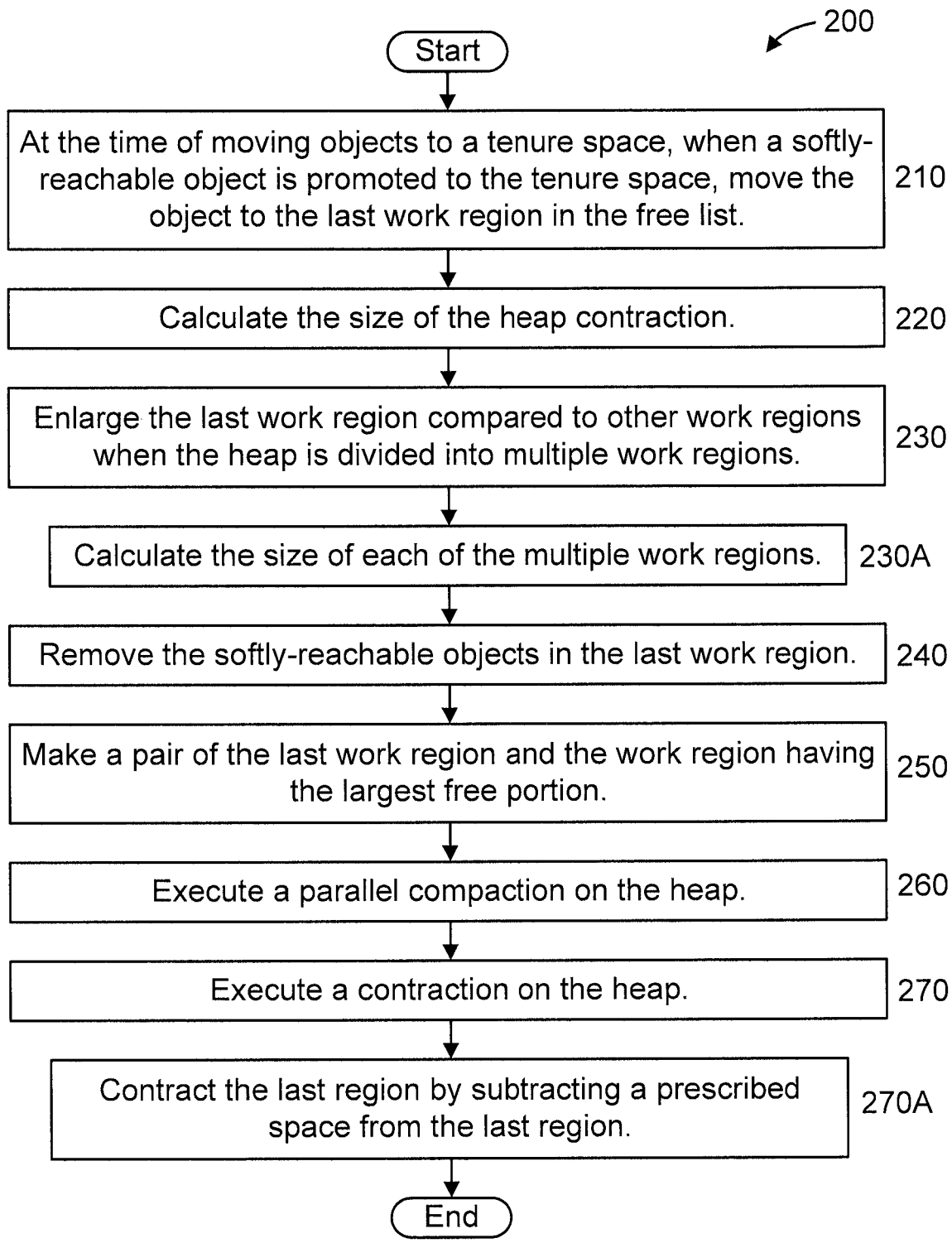
FIG. 2 shows an exemplary method for heap contraction, in accordance with an embodiment of the present invention.

Further, it is to be appreciated that processing system 100 may perform at least part of the method described herein including, for example, at least part of method 200 of FIG. 2. Similarly, part or all of cloud computing environment 450 may be used to perform at least part of method 200 of FIG. 2.

FIG. 2 shows an exemplary method 200 for heap contraction, in accordance with an embodiment of the present invention. In an embodiment, the heap contraction is performed in order to increase the memory density in a cloud environment.

At step 210, at the time of moving objects to a tenure space, when a softly-reachable object is promoted to the tenure space, move the object to the last work region in the free list.

The following steps 220, 230, 240, and 250 are performed before the parallel compaction of step 260.

At step 220, calculate the size of the heap contraction.

At step 230, enlarge the last work region compared to other work regions when the heap is divided into multiple work regions.

In an embodiment, step 230 includes step 230A.

At step 230A, calculate the size of each of the multiple work regions.

At step 240, remove the softly-reachable objects in the last work region.

At step 250, make a pair of the last work region and the work region having the largest free portion.

At step 260, execute a parallel compaction on the heap. The parallel compaction involves performing intra-table compaction and inter-table compaction on the heap.

At step 270, execute a contraction on the heap.

In an embodiment, step 270 includes step 270A.

At step 270A, contract the last region by subtracting a prescribed space from the last region.

In an embodiment, when the size of contraction is not sufficient even after several trials of the contraction, execute single-threaded compaction to acquire the necessary free region by eliminating the fragmentation in the heap. In an embodiment, the number of trials of the contraction can be set by a user.

Figure 3:
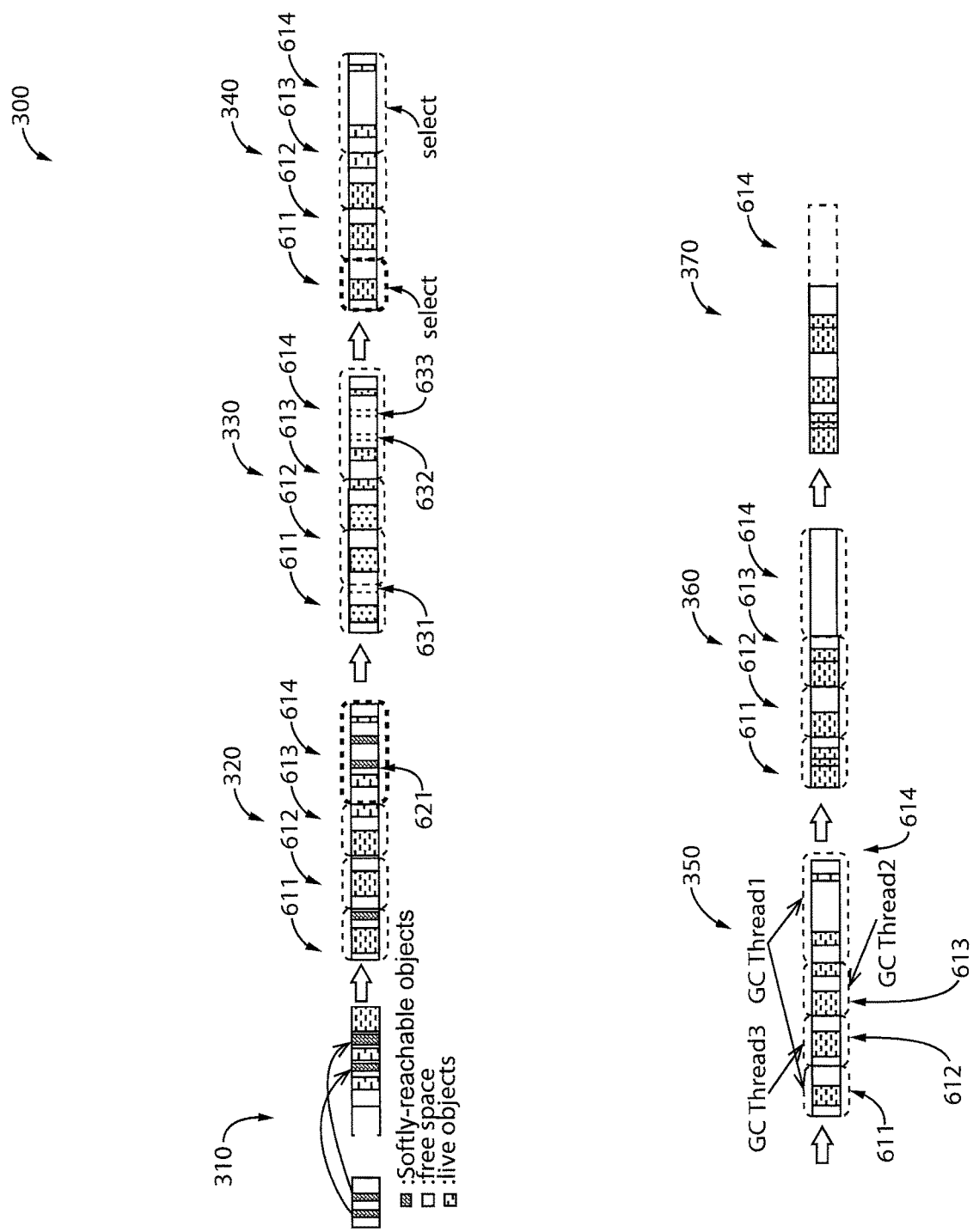
FIG. 3 shows the method of FIG. 2 applied to a particular scenario 300, in accordance with an embodiment of the present invention.

FIG. 3 shows the method of FIG. 2 applied to a particular scenario 300, in accordance with an embodiment of the present invention.

At step 310, move softly-reachable objects 601 and 602 to the last free list entry when they are promoted to tenure space.

At step 320, determine how many tables (regions) are needed for contraction. In the example of FIG. 3, four tables (i.e., tables 611, 612, 613, and 614) are shown and only two of the tables are needed (i.e., tables 611 and 614).

In an embodiment, step 320 includes step 320A.

At step 320A, calculate the contraction point 621.

At step 330, unmark softly-reachable objects 631, 632, and 633 in the target tables (i.e., tables 611 and 614).

At step 340, select two tables (i.e., again tables 611 and 614) that have bigger free list entries than other tables.

At step 350, pass the tables to GC thread 1 through GC thread 3 for parallel processing of the tables (i.e., tables 611, 612, 613, and 614).

At step 360, perform parallel compaction (i.e., intra-table compaction and inter-table contraction) on the tables.

At step 370, perform contraction on the heap as needed. For example, contract the last region (table 614) by subtracting a prescribed space from the last region.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
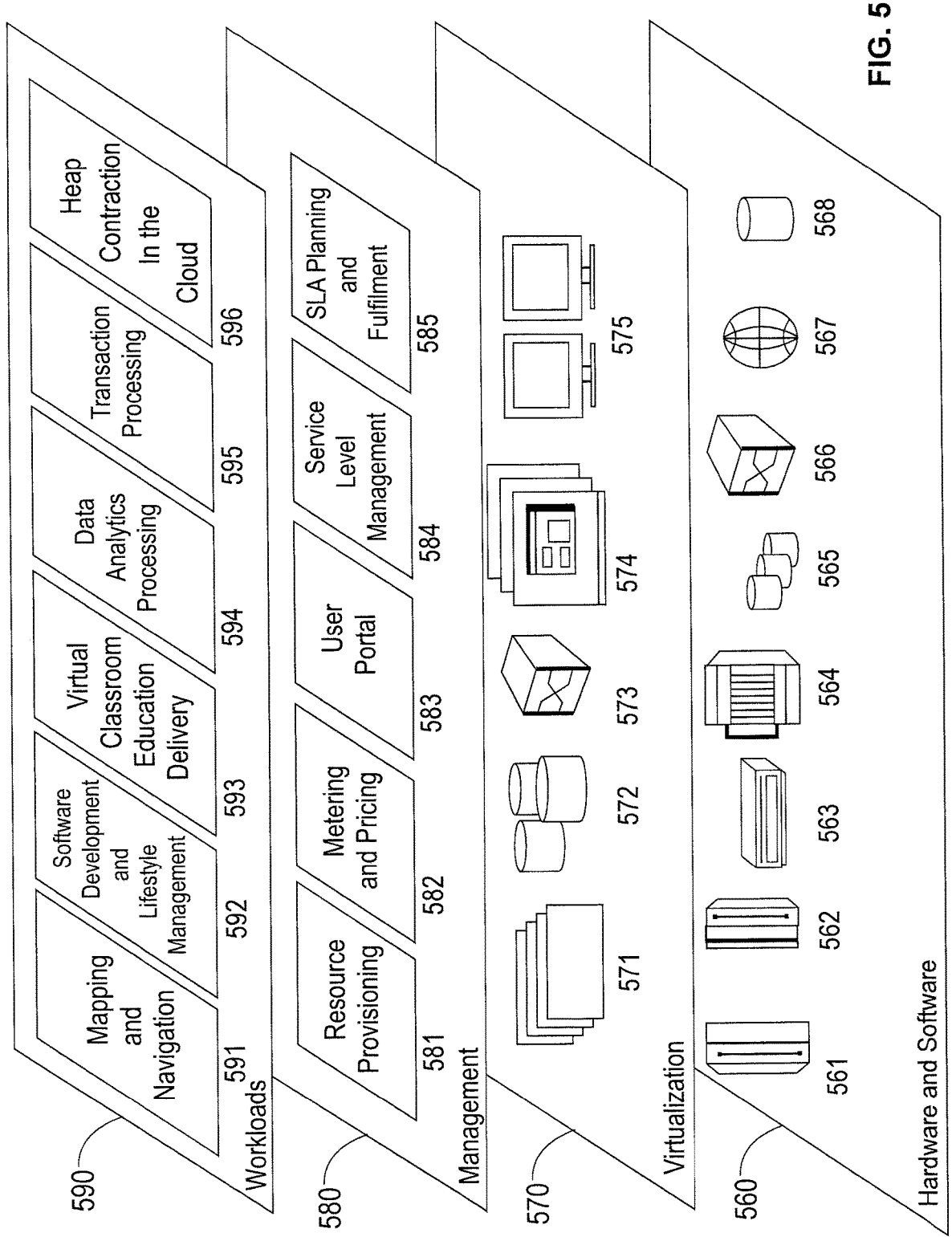
FIG. 5 shows an exemplary set of functional abstraction layers provided by the cloud computing environment shown in FIG. 4, in accordance with an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and heap contraction in a cloud environment 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for increasing memory density in a memory using heap contraction, the method comprising:
    dividing a heap into a plurality of work regions including a last-located region in the heap and other regions such that the last-located region is larger in size than the other regions;
    calculating a size of the heap contraction;
    forming a pair of the last-located region and only one of the other regions, the only one of the other regions having a largest free portion;
    executing intra-table compaction and inter-table compaction on the heap; and
    iteratively contracting the last-located region by subtracting a prescribed space from the last-located region until a threshold contraction size is reached; and
    executing single-threaded heap compaction by eliminating fragmentation in the heap to reach the threshold contraction size after a threshold number of iterative contractions is reached.

2. The computer-implemented method of claim 1, further comprising moving an object to the last-located region responsive to a softly-reachable object being promoted to a tenure space.

3. The computer-implemented method of claim 2, further comprising removing the softly-reachable object from the last-located region.

4. The computer-implemented method of claim 1, wherein the single-threaded heap compaction is executed to acquire a particular free region in the heap when a size of the heap contraction is not sufficient to acquire the particular region after one or more trials of the heap contraction.

5. The computer-implemented method of claim 4, wherein an overall number of the one or more trials of the heap contraction is user-settable.

6. The computer-implemented method of claim 1, wherein the last-located region is a most recently added region in a free list.

7. The computer-implemented method of claim 1, wherein each of the plurality of work regions is implemented as a respective one of a plurality of tables.

8. The computer-implemented method of claim 1, wherein said executing step passes at least some of the plurality of work regions to garbage collection threads for parallel processing, the parallel processing comprising the intra-table compaction and the inter-table compaction on the heap.

9. The computer-implemented method of claim 8, further comprising decreasing a number of the garbage collection threads used for parallel processing to enlarge a size of at least one of the plurality of work regions.

10. The computer-implemented method of claim 9, wherein the number of the garbage collection threads is decreasable to one, depending upon one or more criterion.

11. A computer program product for increasing memory density in a memory using heap contraction, the computer program product comprising a non-transitory computer readable storage medium having program instructions embodied therewith, the program instructions executable by a computer to cause the computer to perform a method comprising:
- dividing a heap into a plurality of work regions including a last-located region and other regions such that the last-located region is larger in size than the other regions;
- calculating a size of the heap contraction;
- forming a pair of the last-located region and only one of the other regions, the only one of the other regions having a largest free portion;
- executing intra-table compaction and inter-table compaction on the heap; and
- iteratively contracting the last-located region by subtracting a prescribed space from the last-located region until a threshold contraction size is reached; and
- executing single-threaded compaction by eliminating fragmentation in the heap to reach the threshold contraction size after a threshold number of iterative contractions is reached.

12. The computer program product of claim 11, wherein the method further comprises moving an object to the last-located region responsive to a softly-reachable object being promoted to a tenure space.

13. The computer program product of claim 12, wherein the method further comprises removing the softly-reachable object from the last-located region.

14. The computer program product of claim 11, wherein the single-threaded heap compaction is executed to acquire a particular free region in the heap when a size of the heap contraction is not sufficient to acquire the particular region after one or more trials of the heap contraction.

15. The computer program product of claim 11, wherein said executing step passes at least some of the plurality of work regions to garbage collection threads for parallel processing, the parallel processing comprising the intra-table compaction and the inter-table compaction on the heap.

16. The computer program product of claim 15, further comprising decreasing a number of the garbage collection threads used for parallel processing to enlarge a size of at least one of the plurality of work regions.

17. The computer program product of claim 16, wherein the number of the garbage collection threads is decreasable to one, depending upon one or more criterion.

18. A computer processing system, comprising:
- a processor operably coupled to a memory, configured to increase a memory density in the memory using heap contraction by:
  - dividing a heap into a plurality of work regions including a last-located region and other regions such that the last-located region is larger in size than the other regions;
  - calculating a size of the heap contraction;
  - forming a pair of the last-located region and only one of the other regions, the only one of the other regions having a largest free portion;
  - executing intra-table compaction and inter-table compaction on the heap; and
  - iteratively contracting the last-located region by subtracting a prescribed space from the last-located region until a threshold contraction size is reached; and
  - executing single-threaded compaction by eliminating fragmentation in the heap to reach the threshold contraction size after a threshold number of iterative contractions is reached.

19. The computer processing system of claim 18, further comprising moving an object to the last-located region responsive to a softly-reachable object being promoted to a tenure space.

20. The computer processing system of claim 19, further comprising removing the softly-reachable object from the last-located region.

* * * * *